(12) United States Patent
Chu

(10) Patent No.: US 7,873,968 B2
(45) Date of Patent: Jan. 18, 2011

(54) POSITION DETECTING DEVICE OF AN OPTICAL DRIVE

(75) Inventor: Shiu-Ming Chu, Taoyuan (TW)

(73) Assignee: Quanta Storage Inc., Taoyuan County (TW)

( * ) Notice: Subject to any disclaimer, the term of this patent is extended or adjusted under 35 U.S.C. 154(b) by 1119 days.

(21) Appl. No.: 11/586,635

(22) Filed: Oct. 26, 2006

(65) Prior Publication Data

US 2007/0186224 A1    Aug. 9, 2007

(30) Foreign Application Priority Data

Feb. 9, 2006    (TW) .............. 95104525 A

(51) Int. Cl.
G11B 17/03    (2006.01)
G11B 17/04    (2006.01)
G11B 33/02    (2006.01)

(52) U.S. Cl. ............. 720/601; 720/606; 720/610
(58) Field of Classification Search ............ 720/601, 720/602, 606, 609, 610, 611, 650
See application file for complete search history.

(56) References Cited

U.S. PATENT DOCUMENTS 6,545,966 B1 *    4/2003    Lin ..................... 720/609

* cited by examiner

Primary Examiner—Craig A. Renner
Assistant Examiner—Gustavo Polo
(74) Attorney, Agent, or Firm—Birch, Stewart, Kolasch & Birch, LLP

(57) ABSTRACT

A position detecting device of an optical drive utilizes a simple wire to connect a CPU of the optical drive to a latch part and a fixing part, such that the latch part, the CPU and the fixing part, which are original parts of the optical drive, form a detecting circuit. When the latch part clasps or releases a tray, the latch part latches or releases the fixing part to close or open the detecting circuit so that the CPU can correctly judge whether the tray enters for positioning, and thus start or shut down the optical drive. In addition, the members such as a flexible cable, a casing and a mainboard may replace parts of the wire to simplify the detecting circuit.

12 Claims, 4 Drawing Sheets

POSITION DETECTING DEVICE OF AN OPTICAL DRIVE

This application claims the benefit of Taiwan application Serial No. 095104525, filed Feb. 9, 2006, the subject matter of which is incorporated herein by reference.

BACKGROUND OF THE INVENTION

1. Field of the Invention

The invention relates in general to an optical drive, and more particularly to a position detecting device of an optical drive for detecting whether a tray for supporting a disk has reached a playing position and thus timely enabling a control circuit of the optical drive.

2. Description of the Related Art

Because an optical drive rotates an optical disk at a high speed, the optical drive has to be opened for the ejection of the disk in a safe state in order to ensure the operation safety of the user. Meanwhile, the optical drive has to correctly judge that the optical disk has been positioned and then rotate the optical disk for the precise read and write operations to prevent the optical disk from being damaged.

FIG. 1 is a schematic illustration showing an interior structure of a conventional optical drive 1. The conventional optical drive 1 accommodates a tray 3 in a hollow casing 2. The tray 3 supports an optical disk 4 and may slide into or out of (tray-in or tray-out) the optical drive 1 from an opening at one end of the casing 2 freely. A spindle motor 5 for clamping and rotating the optical disk 4 is disposed at a middle of the tray 3. A pick-up head 6 capable of sliding back and forth in a radial direction of the optical disk 4 is disposed on the optical disk 4 to read the data on the optical disk 4. A servo circuit board 7 is disposed at a bottom of the tray 3 to control the spindle motor 5 and the pick-up head 6. The rear end of the servo circuit board 7 is connected to one end of a flexible cable 8. The other end of the flexible cable 8 is connected to a mainboard 9 at a rear end of the casing 2. A CPU (Central Processing Unit) 10 for processing a data signal, and a limit switch 11 are disposed on the mainboard 9. A projection 12 projecting from the bottom of the tray 3 presses against the limit switch 11. An ejecting mechanism 13 is disposed at the rear end of the tray 3, and a rotatable latch part 14 is disposed at a lower edge near the front end of the tray 3. One end of the latch part 14 is connected to an actuator 15, and the other end of the latch part 14 is formed with a hook 16 for hooking a fixing part 17 projecting from the casing 2. A panel 18 is disposed at the front end of the tray 3 to shield the front end of the casing 2. An ejecting button 19 is disposed on the panel 18.

When the ejecting button 19 is pressed, the CPU 10 controls the actuator 15 to rotate the latch part 14 such that the hook 16 releases the fixing part 17 and the ejecting mechanism 13 pushes the tray 3 out of the casing 2. Meanwhile, the projection 12 on the bottom of the tray 3 leaves the casing 2 and enables the limit switch 11 to make the CPU 10 brake the spindle motor 5. Thus, the optical disk 4 stops rotating and the optical drive shuts down. On the contrary, when the user wants to push the tray 3 supporting the optical disk 4 into the casing 2, the latch part 14 resists against the ejecting mechanism 13 to hook the fixing part 17 under the pushing force of the user as the tray 3 is moved into the optical drive. Meanwhile, the projection 12 at the bottom of the tray 3 again triggers the limit switch 11 as the tray 3 is moved in, such that the CPU 10 knows that the tray 3 has been positioned to start the optical drive.

However, the conventional optical drive 1 uses the limit switch 11 disposed on the mainboard 9 to detect the position of the tray 3 such that the CPU 10 starts or shuts down the optical drive 1 and controls the rotation of the optical disk to prevent the consumer from danger, prevent the optical disk from being damaged and ensure the precise access of the optical drive 1. Under the requirements of the miniaturized product and the low cost, the limit switch 11 occupies a portion of the area of the mainboard 9 such that the effective circuit layout area of the mainboard 9 is reduced. Meanwhile, the component cost and the manufacturing complexity of the optical drive are increased. Thus, the conventional structure of the optical drive still has to be simplified.

SUMMARY OF THE INVENTION

It is therefore an object of the invention to provide a position detecting device of an optical drive, wherein an ON/OFF circuit is formed using the original latch part of the optical drive to simplify the structure of the optical drive and reduce the component cost.

Another object of the invention is to provide a position detecting device of an optical drive, which has a reduced number of elements disposed on a mainboard, an enlarged effective area of the mainboard, and an enhanced layout and expansion flexibility.

Still another object of the invention is to provide a position detecting device of an optical drive, which can detect the position of the tray using the simple wire to shorten the time of manufacturing the product.

The invention achieves the above-identified objects by providing a position detecting device of an optical drive, which utilizes a simple wire to connect a CPU of the optical drive to a latch part and a fixing part. The CPU, the latch part and the fixing part, which are the original members of the optical drive, form a detecting circuit. When the latch part clasps or releases the tray, the latch part latches or releases the fixing part to close or open the detecting circuit such that the CPU can correctly judge whether the tray has been entered and positioned so as to start or shut down the optical drive. In addition, the members such as a flexible cable, a casing and a mainboard may replace parts of the wire to simplify the detecting circuit.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
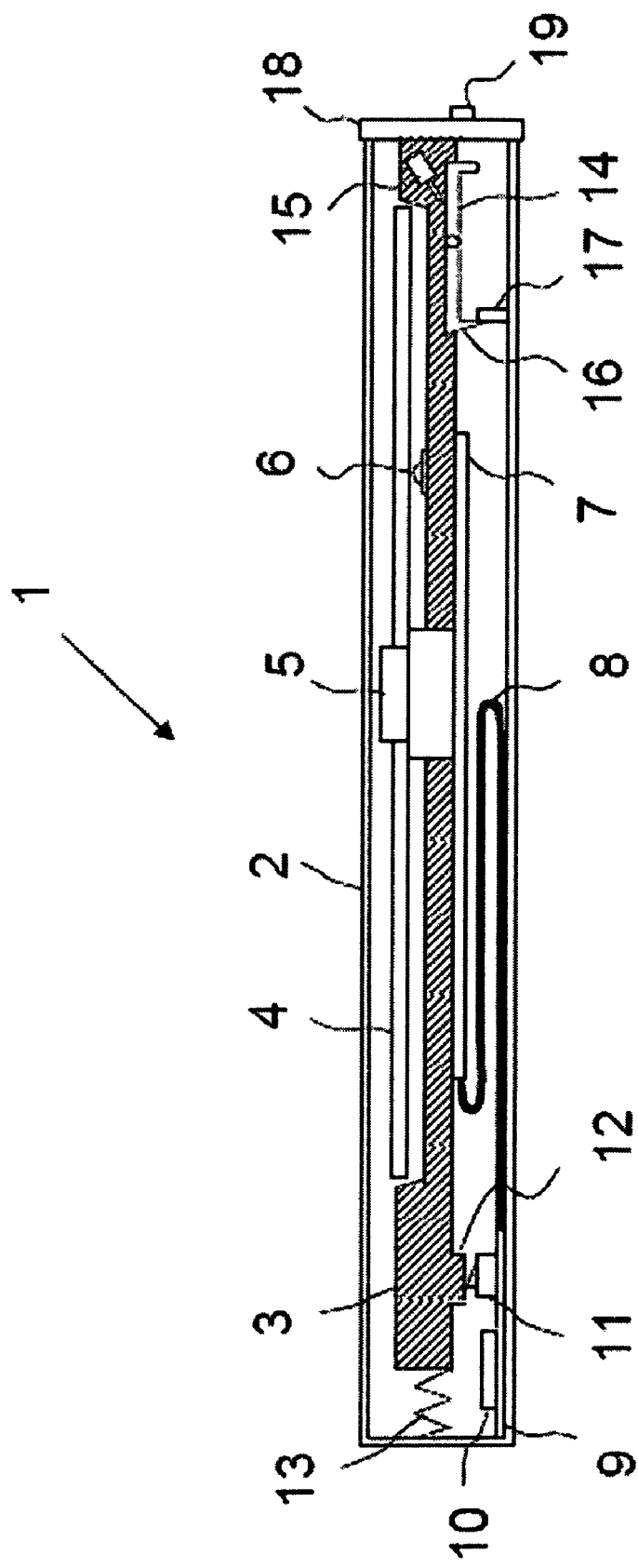
FIG. 1 (Prior Art) is a schematic illustration showing a cross-section of an interior structure of a conventional optical drive.
Figure 2:
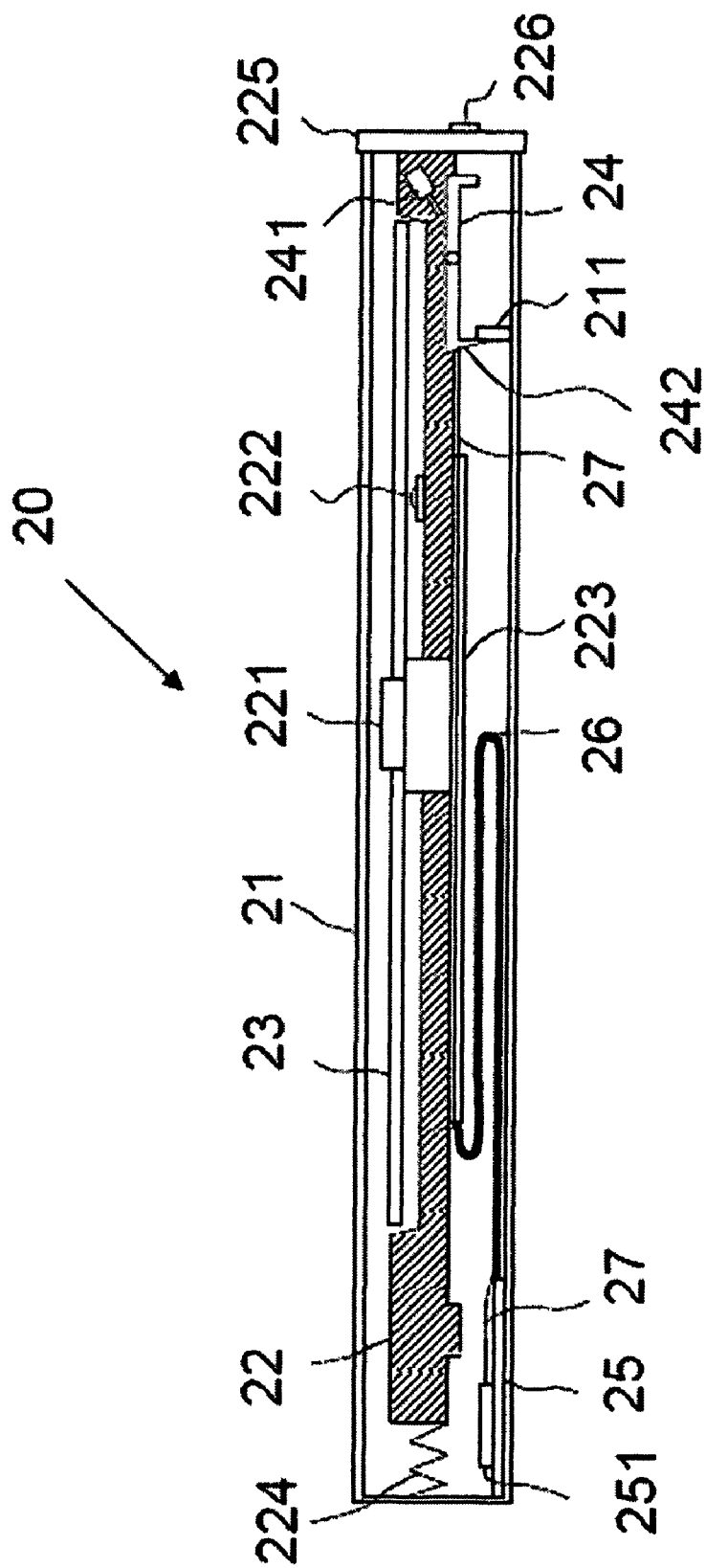
FIG. 2 is a schematic illustration showing a cross-section of an interior structure of an optical drive according to a first embodiment of the invention.

FIG. 2 is a schematic illustration showing a position detecting device disposed in an optical drive 20 according to a first embodiment of the invention. The optical drive 20 includes a casing 21, a tray 22, an optical disk 23, a latch part 24 and a mainboard 25. The tray 22 supporting the optical disk 23 freely slides into and out of the casing 21, and the latch part 24 latches the tray 22 in the hollow casing 21. The electronic element on the mainboard 25 controls the optical drive to read/write the data on the optical disk 23.

The casing 21 is made of metal and has a hollow shape. The front end of the casing 21 is formed with an opening. A fixing part 211 projects from an inner bottom surface of the opening. The tray 22 is accommodated in the hollow casing 21 and can freely slide into and out of the casing 21. A spindle motor 221 for rotating the optical disk 23 is disposed on the tray 22. A pick-up head 222 capable of sliding back and forth in a radial direction of the optical disk 23 is disposed near the optical disk 23 to read the data on the optical disk 23. A servo circuit board 223 is disposed on a bottom of the tray 22. Electronic elements for controlling spindle motor 221 and the pick-up head 222 are disposed on the servo circuit board 223. An ejecting mechanism 224 extends from the read end of the tray 22 to compress and press against the rear wall of the casing 21. A panel 225 for shielding the opening of the casing 21 is disposed at a front end of the tray 22. An ejecting button 226 is disposed on the panel 225.

In addition, a rotatable metallic latch part 24 is disposed at a lower edge near the front end of the tray 22. One end of the latch part 24 is connected to an actuator 241, and the other end of the latch part 24 has a hook 242 for hooking the metal fixing part 211 projecting from the casing 21, such that the tray 22 entering the casing 21 can be locked in the hollow casing 21. The mainboard 25 is disposed on a bottom surface of a rear end in the casing 21 and is grounded to the casing 21. A CPU 251 for processing a data signal is disposed on the mainboard 25. The front end of the mainboard 25 is connected to a flexible cable 26. The other end of the flexible cable 26 is connected to the rear end of the servo circuit board 223. The servo circuit board 223 can transmit the data read by the pick-up head 222 to the CPU 251 through the flexible cable 26, and the CPU 251 may also transmit a control signal to the servo circuit board 223 to control the spindle motor 221, the pick-up head 222 and the actuator 241.

In addition, one end of a wire 27 is connected to the latch part 24. The wire 27 is connected to the flexible cable 26 and disposed in parallel to the flexible cable 26 at the rear end of the servo circuit board 223 along and on the tray 22, extended to the front end of the mainboard 25, and then connected to the pin of the CPU 251. Thus, the latch part 24, the wire 27, the CPU 251, the mainboard 25, the casing 21 and the fixing part 211 form a detecting circuit.

Figure 3:
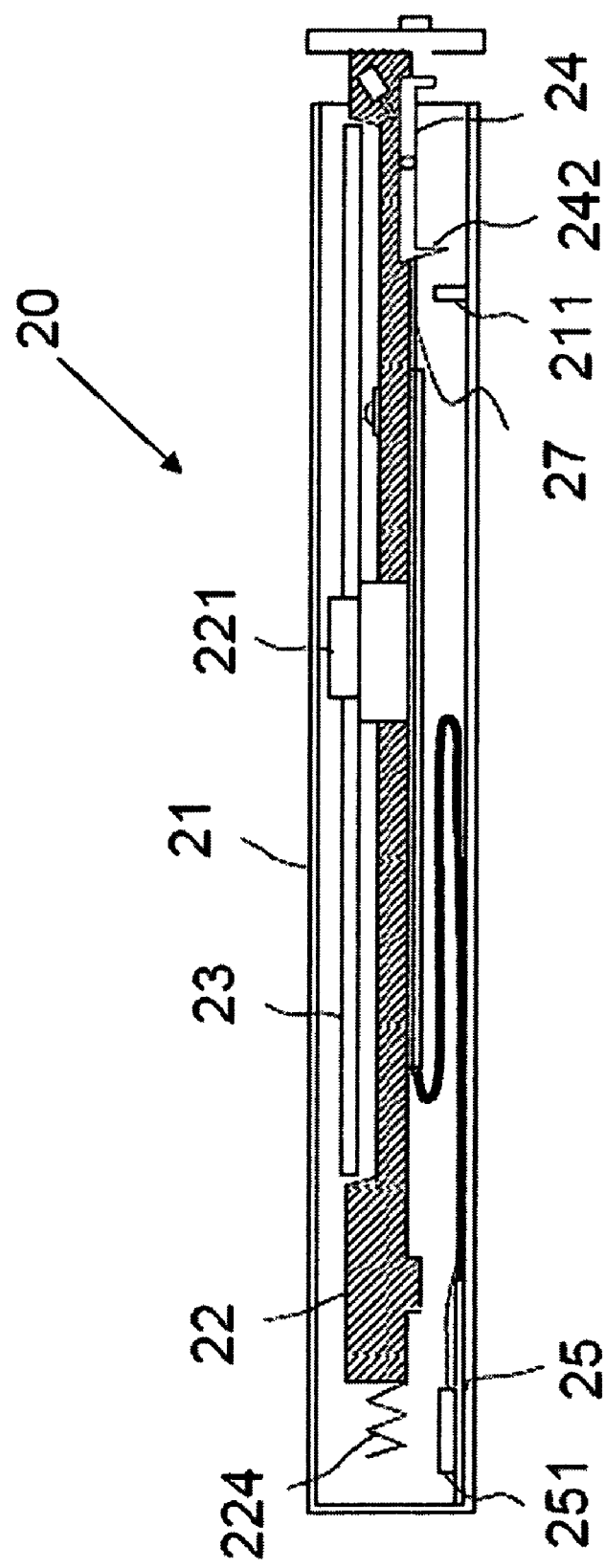
FIG. 3 is a schematic illustration showing the optical drive for pushing out a tray according to the first embodiment of the invention.

The operation of the position detecting device of the invention will be described in the following. First, when the ejecting button 226 is pressed or the host outputs an request for ejecting the optical disk, the CPU 251 receives the request of the ejecting button 226 or the host, and transmits the control signal through the flexible cable 26 to control the actuator 241 to rotate the latch part 24 such that the hook 242 releases the fixing part 211. FIG. 3 is a schematic illustration showing that the ejecting mechanism 224 pushes out the tray 22. When the ejecting mechanism 224 pushes the tray 22 out of the casing 21 and the hook 242 releases the fixing part 211, the latch part 24, the wire 27, the CPU 251, the mainboard 25, the casing 21 and the fixing part 211 form a detecting circuit, which is an open circuit, such that the CPU 251 can correctly judge that the disk is being rejected and thus brake the spindle motor 221 to stop the optical disk 23 and shut down the optical drive 20.

On the contrary, when the tray 22 for supporting the optical disk 23 pushes the casing 21, the latch part 24 is moved into the optical drive 20 together with the tray 22. Under the action of the pushing force, the tray 22 resists the resilience of the ejecting mechanism 224 such that the hook 242 hooks the fixing part 211. When the hook 242 hooks the fixing part 211, the latch part 24, the wire 27, the CPU 251, the mainboard 25, the casing 21 and the fixing part 211 form a closed detecting circuit such that the CPU 251 knows that the tray 22 has entered for positioning and thus starts the optical drive 20.

Consequently, the position detecting device of the optical drive of the invention utilizes the original members, such as the latch part 24, the CPU 251, the mainboard 25, the casing 21 and the fixing part 211, and the wire 27 to form the detecting circuit. The detecting circuit is closed or opened when the latch part 24 clasps or releases the tray 22, such that the CPU 251 can correctly judge whether the tray 22 has entered for positioning to achieve the conventional function of the limit switch. So, the limit switch can be eliminated, and the component cost of the limit switch can be reduced. In addition, the structure of the optical drive can be simplified, and the wire formation on the mainboard can be reduced. Furthermore, the effective area of the mainboard can be enlarged, the layout and expansion flexibility can be enhanced, and the working time can be shortened.

Figure 4:
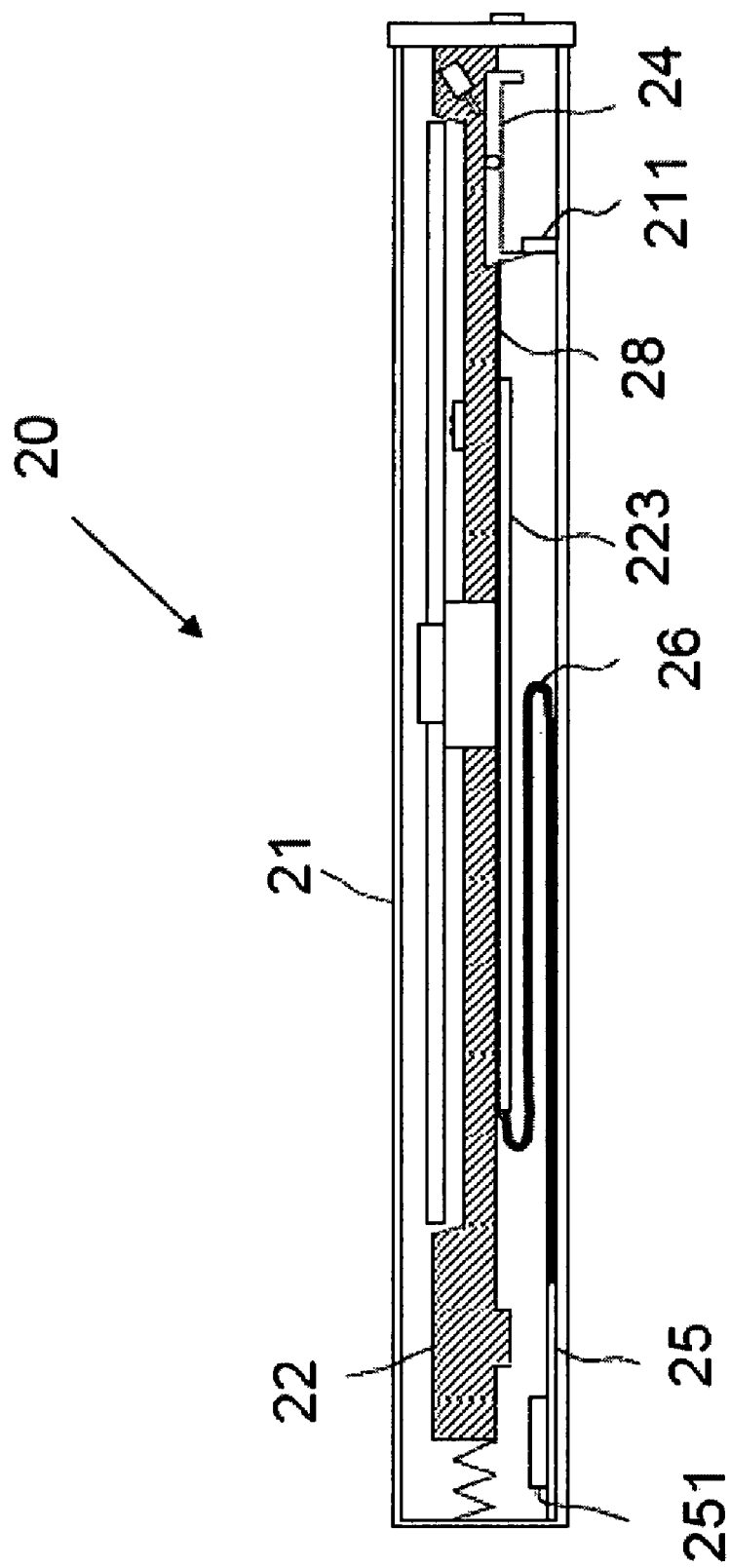
FIG. 4 is a schematic illustration showing a cross-section of an interior structure of an optical drive according to a second embodiment of the invention.

FIG. 4 is a schematic illustration showing a cross-section of an interior structure of an optical drive according to a second embodiment of the invention. The basic architecture and operation of the second embodiment of the invention are similar to those of the first embodiment. In order to simplify the illustration, the same symbols denote the same members of the first embodiment. The difference between the second embodiment and the first embodiment of the invention resides in a wire 28, which has one end connected to the latch part 24 and disposed on and along the tray 22. The wire 28 is connected to the flexible cable 26 at the rear end of the servo circuit board 223. The redundant trace of the flexible cable 26 is used and connected to the pin of the CPU 251. Thus, the original members of the optical drive 20, such as the latch part 24, the wire 28, the flexible cable 26, the CPU 251, the mainboard 25, the casing 21 and the fixing part 211, form the detecting circuit to further simplify the arrangement of the wire 28.

Although the metal casing serves as one member of the detecting circuit in the embodiments of the invention, the detecting circuit may be formed by using the wire to connect the fixing part to the pin of the CPU when the casing is not made of the metallic material. Meanwhile, the latch part can be disposed in the casing and the fixing part can be disposed in the tray without disabling the objects of the invention according to the embodiments, in which the latch part is disposed in the tray and the fixing part is disposed in the casing.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A position detecting device of an optical drive, the position detecting device comprising:
   a mainboard having a CPU (Central Processing Unit) for controlling the optical drive;
   a fixing part fixed in the optical drive;
   a latch part for latching or releasing the fixing part; and
   at least one wire for connecting the CPU to the latch part and the fixing part to form a detecting circuit;

wherein when the latch part clasps or releases a tray of the optical drive, the latch part latches or releases the fixing part to close or open the detecting circuit, so that the CPU judges whether the tray enters for positioning and starts or shuts down the optical drive in order to eject the tray, under control of the CPU, the latch part is rotated such that the latch part releases the fixing part, the detection circuit is opened, such that the CPU judges that the tray is ejected and shuts down the optical drive; and when the tray is pushed into the optical drive, the latch part is moved into the optical drive, the latch part hooks the fixing part and the detecting circuit is closed such that the CPU judges that the tray enters for positioning and starts the optical drive.

2. The device according to claim 1, wherein the at least one wire is connected to the CPU through the mainboard.

3. The device according to claim 1, wherein the optical drive further comprises a casing for accommodating the detecting circuit.

4. The device according to claim 3, wherein the casing is made of a conductive material, the fixing part is disposed near a front end of the casing, and the at least one wire connects the fixing part to the CPU through the casing, so that the conductive casing serves as a member of the detecting circuit.

5. The position detecting device according to claim 4, wherein the casing forms the at least one wire between the fixing part and the CPU.

6. The position detecting device according to claim 4, wherein the mainboard is disposed at a rear end of the casing and is grounded to the casing and connected to the fixing part.

7. The position detecting device according to claim 4, wherein a tray is disposed in the casing, the tray is movable in and out of the casing, the latch part is disposed near a front end of the tray, one end of the latch part is connected to an actuator, the other end of the latch part is formed with a hook for hooking the fixing part, one end of the at least one wire is connected to the latch part and disposed on the tray, and the other end of the at least one wire is connected to the mainboard.

8. The position detecting device according to claim 7, wherein a flexible cable is connected to a rear end of the tray, and the at least one wire and the flexible cable are disposed in parallel and connected to the mainboard.

9. The position detecting device according to claim 8, wherein the one end of the at least one wire is connected to the latch part, the other end of the at least one wire is connected to a redundant trace of the flexible cable and then connected to the mainboard.

10. The position detecting device according to claim 3, wherein a tray is disposed in the casing, the tray is movable in and out of the casing, the latch part is disposed near a front end of the casing, and the fixing part is disposed near a front end of the tray.

11. The position detecting device according to claim 1, wherein the fixing part is made of a conductive material.

12. The position detecting device according to claim 2, wherein the latch part is made of a conductive material.

* * * * *